United States Patent [19]

Kanai et al.

[11] Patent Number: 4,675,250
[45] Date of Patent: Jun. 23, 1987

[54] MAGNETIC RECORDING MEDIUM

[75] Inventors: Hiroyuki Kanai, Utsunomiya; Tetsuya Imamura, Tokyo; Takeshi Takeuchi, Utsunomiya; Shigetoshi Suzue, Wakayama, all of Japan

[73] Assignee: Kao Corporation, Tokyo, Japan

[21] Appl. No.: 838,475

[22] Filed: Mar. 11, 1986

[30] Foreign Application Priority Data

| Mar. 20, 1985 [JP] | Japan | 60-56554 |
| Mar. 20, 1985 [JP] | Japan | 60-56558 |
| Dec. 16, 1985 [JP] | Japan | 60-282354 |
| Dec. 16, 1985 [JP] | Japan | 60-282355 |

[51] Int. Cl.⁴ .............................................. G11B 5/71
[52] U.S. Cl. ..................... 428/403; 252/62.54; 427/128; 428/425.9; 428/522; 428/524; 428/532; 428/694; 428/695; 428/900
[58] Field of Search ............... 428/695, 694, 425.9, 428/522, 900, 403, 524, 532; 427/131, 128; 252/62.54; 360/134–136

[56] References Cited

U.S. PATENT DOCUMENTS

| 4,172,176 | 10/1979 | Tanaka | 428/695 |
| 4,247,407 | 1/1981 | Waruse | 427/128 |
| 4,383,000 | 5/1983 | Fujiki | 428/900 |
| 4,383,001 | 5/1983 | Fujiki | 428/900 |
| 4,420,540 | 12/1983 | Ogawa | 428/900 |
| 4,522,885 | 6/1985 | Funahashi | 428/900 |
| 4,595,640 | 6/1986 | Chernega | 428/900 |

Primary Examiner—Ellis P. Robinson
Attorney, Agent, or Firm—Birch, Stewart Kolasch & Birch

[57] ABSTRACT

A magnetic recording medium having improved lubricity and durability properties which comprises a magnetic powder, a resin binder and an ester compound of the formula (1):

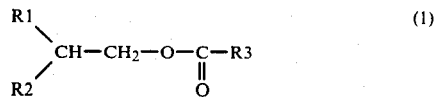

in which $R_1$ and $R_2$ are each a straight or branched, saturated alkyl having 1 to 25 carbon atoms and $R_3$ is an unsaturated hydrocarbon group or a straight or branched, saturated alkyl and has 7 to 27 carbon atoms, provided that the total carbon atom number of $R_1$ and $R_2$ ranges from 18 to 32 when $R_3$ is the unsaturated hydrocarbon group and that ranges from 22 to 32 when $R_3$ is the saturated alkyl. It is improved in lubricity and durability.

12 Claims, No Drawings

MAGNETIC RECORDING MEDIUM

The present invention relates to a magnetic recording medium having an unexpectedly improved durability.

Statement of Prior Arts.

A magnetic recording medium is generally prepared by applying a magnetic paint comprising a magnetic powder, a binder resin, an organic solvent and other necessary components to a base such as a polyester film. The magnetic layer of a floppy disc of a magnetic recording medium, are required to be characterized by a high wear resistance and an excellent durability since the magnetic layer component wears off easily. This is due to the intense rubbing of said magnetic layer component against a magnetic head or jacket liner during the recording and reproducing process.

A known process for improving the wear resistance of a magnetic layer comprises the incorporation of various lubricants in the magnetic layer.

The lubricants used heretofore include, for example, fatty acids, oleyl oleate, stearic acid butoxide, fatty acid amides, liquid paraffin and waxes. However, the performance of these lubricants are still not satisfactory. For example, the effect oleyl oleate and stearic acid butoxide have on improving the durability of the medium, is insufficient and although fatty acids such as stearic or oleic acid and hydrocarbon lubricants such as liquid paraffin are effective in improving the durability of the medium, their compatibility with a binder is poor and, therefore, when they are used in large amounts, they tend to bleed from the surface of the magnetic layer resulting in staining the head in a manner which is undesirable.

Summary of the Invention

After intensive investigations made to developing a magnetic recording medium having an excellent lubricity and which exhibits a remarkably improved durability under various conditions of use, the inventors have developed the present invention.

The present invention relates to a magnetic recording medium which comprises a magnetic powder and a resin binder, an improvement provided by the present invention comprises addition thereto of an ester compound of the formula (1):

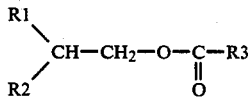

(1)

in which $R_1$ and $R_2$ are each a straight or branched, saturated alkyl having 1 to 25 carbon atoms and $R_3$ is an unsaturated hydrocarbon group or a straight or branched, saturated alkyl and has 7 to 27 carbon atoms, provided that the total carbon atom number of $R_1$ and $R_2$ ranges from 18 to 32 when $R_3$ is the unsaturated hydrocarbon group and that ranges from 22 to 32 when $R_3$ is the saturated alkyl.

The invention provides two embodiments, one where $R_3$ is an unsaturated group and the other where $R_3$ is a saturated group. It is more practical that the total carbon atoms of $R_1$ and $R_2$ ranges from 18 to 26 when $R_3$ is an unsaturated hydrocarbon group having 15 to 27 carbon atoms and then the total carbon atoms of $R_1$ and $R_2$ ranges from 22 to 26 when $R_3$ is a straight or branched, saturated alkyl.

The invention provides the magnetic recording medium with an improved lubricity and eventually an improved durability.

The first embodiment is prepared as shown below.

The ester compounds of the present invention represented by the above general formula (1) are specifically selected ester compounds. More particularly, they are ester compounds which comprise those having a portion derived from an alcohol, i.e. a branched alcohol having 20 to 34 carbon atoms and a portion derived from a fatty acid, i.e. an unsaturated monobasic fatty acid having 8 to 28 carbon atoms. The reason why the lubricity of a magnetic recording medium is improved remarkably by using the above-specifically selected ester compound as the lubricant has not yet been elucidated.

According to the inventors' investigations, the most suitable ester lubricants, from the viewpoint of a compatibility thereof with the binder are those having relatively high molecular weights and are highly effective in improving the lubricities of magnetic recording media. However, many ordinary esters having a high molecular weight also have high melting points and, therefore, though their lubricities are good at relatively high temperature regions, their fluidities and penetrabilities are poor at low temperatures. For example, at 5° C., they cannot impart excellent durabilities to the media at such low temperatures. From these facts it is proposed that the melting point of an ester compound used in the present invention is lowered by a synergistic effect, due to the selection of the branched particular alcohol and the particular saturated and unsaturated fatty acid from which said ester compound was formulated, to realize an excellent lubricity of the magnetic recording medium and to improve the durability thereof.

The ester compound contained in the magnetic recording medium of the present invention can be obtained by esterifying an unsaturated fatty acid having 8 to 28 carbon atoms with a branched alcohol having 20 to 34 carbon atoms. The branched alcohol to use as a starting material for the ester compound of the invention may be obtained, for example, by the Guerbet reaction. The unsaturated fatty acid to use for the same purpose, includes decylenic acid, undecylenic acid, physeteric acid, palmitoleic acid, oleic acid, linolic acid, linolenic acid, arachidonic acid, erucic acid and nervonic acid.

The second embodiment is prepared as shown below.

The ester compounds of the present invention represented by the above general formula (1) are specifically selected ester compounds. More particularly, they are ester compounds which comprise those having a portion derived from an alcohol, i.e. a branched alcohol having 24 to 34 carbon atoms and a portion derived from a fatty acid, i.e. a monobasic fatty acid having 8 to 28 carbon atoms. The reason why the durability of a magnetic recording medium is improved remarkably by using the above-specifically selected ester compound as the lubricant has not yet been elucidated.

The ester compound contained in the magnetic recording medium of the present invention can be obtained by esterifying a monobasic fatty acid having 8 to 28 carbon atoms with a branched alcohol having 24 to 34 carbon atoms. The branched alcohols used herein are those produced by the Guerbet reaction and are called Guerbet alcohols.

Among these ester compounds, those having a total of 30 carbon atoms are preferred.

The ester compounds of the present invention may either be directly incorporated in a magnetic paint or initially be dissolved in a suitable solvent and then sprayed on a magnetic coating film. An ordinary lubricant may further be used in combination with the ester compound of the present invention.

Examples of the magnetic powder according to the present invention include very fine, acicular metal oxides such as $\gamma$-$Fe_2O_3$, $Fe_3O_4$ and $CrO_2$, processed $\gamma$-$Fe_2O_3$ such as Co-coated $\gamma$-$Fe_2O_3$ and Co-doped $\gamma$-$Fe_2O_3$; metallic iron powder; very fine, platy barium ferrite in which the Fe atom may be partially replaced with one or more of Ti, Co, Zn, V and Nb and ultra-fine powders of metals and alloys such as Co, Fe-Co and Fe-Ni. Among them, the metallic iron powder has quite poor chemical stability and, therefore, it may be surface-treated or a small amount of nickel, cobalt, titanium, silicon or aluminum may be added thereto in the form of the metal atom or a salt or oxide thereof to improve the stability thereof. Further, the metallic iron powder may also be stabilized by having a thin oxide film coated onto its surface the coating having been formed in a weakly oxidizing atmosphere.

Examples of binders usable in the present invention include polyurethane, polyester, polyvinyl chloride, vinyl chloride/vinyl acetate copolymer, polyacrylonitrile, nitrile rubber, epoxy resin, alkyd resin, polyamide, polyacrylate, polymethacrylate, polyvinyl acetate, polyvinyl butyral, polyvinylidene chloride, vinylidene chloride copolymer, nitrocellulose, maleic acid-modified vinyl chloride/vinyl acetate copolymer and ethylcellulose. Although the binders may be used alone, they are generally used in the form of a mixture of two or more. A plasticizer or a hardening agent may further be added to the resin binder to control its hardness.

The amount of the binder is generally 15 to 60 parts by weight for 100 parts by weight of the magnetic powder. When the amount of the binder is less than 15 parts by weight, the obtained magnetic coating film has poor strength and its adhesion to the base material is insufficient. On the contrary, when an amount of the binder is larger than 60 parts by weight, the concentration of the magnetic powder in the magnetic coating film is insufficient and its reproduction power is reduced disadvantageously. Further, in such a case, the properties of the coating film are often deteriorated.

The ester compound of the above general formula (1) is used in an amount of usually 1 to 15 wt. % based on the weight of the magnetic powder.

EXAMPLES

The following examples will further illustrate the present invention, which by no means limit the invention.

EXAMPLES 1 TO 11

A mixture having the following composition was prepared using a lubricant shown in Table 1:

| | |
|---|---|
| Co-coated $\gamma$-$Fe_2O_3$ | 100 parts by weight |
| vinyl chloride/vinyl acetate copolymer*[1] | 30 parts by weight |
| nitrile/butadiene rubber*[2] | 15 parts by weight |
| carbon black | 7 parts by weight |
| aluminum oxide | 6 parts by weight |
| toluene | 150 parts by weight |
| methyl ethyl ketone | 150 parts by weight |
| lecithin | 1 parts by weight |
| lubricant | 6 parts by weight |

Notes
*[1] trade name: VAGH (a product of U.C.C., U.S.A.)
*[2] trade name: 1432 J (a product of Nippon Zeon Co., Ltd.).

Then, the mixture was kneaded in a sand mill for 15 hours 7 parts by weight of a polyisocyanate compound ( Coronate l; a product of Nippon Polyurethane Co., Ltd.) was added thereto to obtain 11 kinds of magnetic paints. Each of the paints was applied to a polyethylene tetrephthalate film having a thickness of $75\mu$ so that the thickness of the coating layer after drying would be $1.5\mu$. After drying, it was calendered. After leaving it to stand at 60° C. for 4 days for curing, discs were cut out and their surfaces were polished to form magnetic discs.

Each of these discs was placed in an accelerated durability test drive and the running time required until the reproduction output was reduced to 70% based on the initial output was measured at 5° C. to examine durability. Results are shown in Table 1.

TABLE 1

| Example | Lubricant | Durability at 5° C. (h) |
|---|---|---|
| 1 | 2-decyltridecyl oleate | 130 |
| 2 | 2-octyldodecyl oleate | 100 |
| 3 | 2-octyldodecyl erucate | 85 |
| 4 | 2-decyltridecyl linolate | 80 |
| 5 | 2-decyltetradecyl oleate | 140 |
| 6 | 2-tetradecyloctadecyl oleate | 135 |
| 7 | 2-dodecyltetradecyl erucate | 130 |
| 8 | 2-decyltetradecyl linolate | 110 |
| 9 | 2-tetradecyloctadecyl undecylenate | 90 |
| 10 | 2-decylhexadecyl undecylenate | 85 |
| 11 | 2-octyldodecyl nervonate | 85 |

COMPARATIVE EXAMPLES 1 TO 6

Six kinds of magnetic paints were prepared using the same amounts of the same components as in Example 1 except that the lubricant was replaced with 6 parts by weight of a lubricant shown in Table 2 in the same manner as above. Magnetic discs were prepared by using these paints in the same manner as in Example 1 and the durabilities of the obtained discs were examined to obtain the results shown in Table 2.

TABLE 2

| Comp. Ex. | Lubricant | Durability at 5° C. (h) |
|---|---|---|
| 1 | oleyl oleate | 30 |
| 2 | 2-hexyldecyl stearate | 45 |
| 3 | butoxyethyl stearate | 30 |
| 4 | 2-ethylhexyl stearate | 40 |
| 5 | 2-octyldecyl stearate | 45 |
| 6 | tridecyl stearate/isocetyl stearate (3/3) | 40 |

EXAMPLES 12 TO 22

A mixture having the following composition was prepared using a lubricant shown in Table 3.

| | |
|---|---|
| Co-coated $\gamma$-$Fe_2O_3$ | 100 parts by weight |
| vinyl chloride/vinyl acetate copolymer*[1] | 30 parts by weight |
| nitrile/butadiene rubber*[2] | 15 parts by weight |

-continued

| | |
|---|---|
| carbon black | 7 parts by weight |
| aluminum oxide | 6 parts by weight |
| toluene | 150 parts by weight |
| methyl ethyl ketone | 150 parts by weight |
| lecithin | 1 parts by weight |
| lubricant | 6 parts by weight |

Notes
[*1]trade name: VAGH (a product of U.C.C., U.S.A.)
[*2]trade name: 1432 J (a product of Nippon Zeon Co., Ltd.)

Then, the mixture was kneaded in a sand mill for 15 hours. Seven parts by weight of a polyisocyanate compound, Coronate, a tradename of Nippon Polyurethane Co., Ltd., was added thereto to obtain 11 magnetic paints. Each of them was applied to a polyethylene terephthalate film having a thickness of 75μ so that the thickness of the coating layer after drying would be 1.5μ. After drying, it was calendered. After leaving it to stand at 60° C. for 4 days for curing, discs were cut out and their surfaces were polished to form magnetic discs.

Each of these discs was placed in an accelerated durability test drive and the running time required until the reproduction output was reduced to 70% based on the initial output was measured at 5° C. and 25° C., respectively, to examine durability. Results are shown in Table 3.

TABLE 3

| Example | Lubricant | Durability (h) at 5° C. | 25° C. |
|---|---|---|---|
| 12 | 2-decyltetradecyl caprylate | 65 | 405 |
| 13 | 2-dodecyltetradecyl laurate | 75 | 425 |
| 14 | 2-decyltetradecyl palmitate | 70 | 450 |
| 15 | 2-decyltetradecyl isomyristate | 80 | 460 |
| 16 | 2-decyltetradecyl stearate | 85 | 475 |
| 17 | 2-decyltetradecyl behenate | 85 | 455 |
| 18 | 2-hexadecyloctadecyl caprylate | 70 | 415 |
| 19 | 2-tetradecyloctadecyl palmitate | 75 | 440 |
| 20 | 2-dodecyloctadecyl stearate | 85 | 480 |
| 21 | 2-dodecyloctadecyl behenate | 80 | 480 |
| 22 | 2-dodecyloctadecyl cerotate | 70 | 425 |

COMPARATIVE EXAMPLES 7 TO 11

Five magnetic paints were prepared in the same way as shown in example 12, except that 6 parts by weight of the lubricants shown in Table 4, respectively, were used instead. Then five magnetic discs were produced from the paints, respectively, and were examined in view of durability. Results are are shown in Table 4.

TABLE 4

| Comp. Ex. | Lubricant | Durability (h) at 5° C. | 25° C. |
|---|---|---|---|
| 7 | 2-hexyldecyl stearate | 45 | 155 |
| 8 | oleyl oleate | 30 | 135 |
| 9 | butoxyethyl stearate | 30 | 125 |
| 10 | 2-ethylhexyl stearate | 40 | 130 |
| 11 | tridecyl stearate/isocetyl stearate (3/3) | 40 | 140 |

The embodiments of the invention in which an exclusive property or privilege is claimed are defined as follows:

1. A magnetic recording medium which comprises a magnetic powder, a resin binder and an ester lubricant of the formula (1):

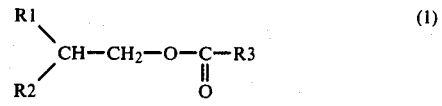

in which R1 and R2 are each a straight or branched, saturated alkyl having 1 to 25 carbon atoms and R3 is an unsaturated hydrocarbon group or a straight or branched, saturated alkyl and has 7 to 27 carbon atoms, provided that the total carbon atom number of R1 and R2 ranges from 18 to 32 when R3 is the unsaturated hydrocarbon group and that ranges from 22 to 32 when R3 is the saturated alkyl.

2. A magnetic recording medium according to claim 1, in which the total carbon atoms of R1 and R2 ranges from 18 to 26 and R3 is an unsaturated hydrocarbon group having 15 to 27 carbon atoms.

3. A magnetic recording medium according to claim 1, in which the total carbon atoms of R1 and R2 ranges from 22 to 26 and R3 is a straight or branched, saturated alkyl.

4. A magnetic recording medium according to claim 1, wherein said magnetic powder is present in an amount of 100 parts by weight, said resin binder is present in an amount of 15 to 60 parts by weight based on 100 parts by weight of the magnetic powder and said ester lubricant is present in an amount of 1 to 15 percent by weight based on the magnetic powder.

5. A magnetic recording medium according to claim 1, which comprises a substrate, which has been coated with a composition comprising said magnetic powder, said resin binder and said ester lubricant.

6. A magnetic recording medium according to claim 1, wherein the ester lubricant is derived from an unsaturated fatty acid and an alcohol, said unsaturated fatty acid selected from the group consisting of decylenic acid, undecylenic acid, physeteric acid, palmitoleic acid, oleic acid, linoleic acid, linolenic acid, arachidonic acid, erucic acid and nervonic acid.

7. A magnetic recording medium according to claim 1, wherein the resin binder is selected from the group consisting of polyurethane, polyester, polyvinyl chloride, vinyl chloride/vinyl acetate copolymer, polyacrylonitrile, nitrile rubber, epoxy resin, alkyd resin, polyamide, polyacrylate, polymethacrylate, polyvinyl acetate, polyvinyl butyral, polyvinylidene chloride, vinylidene chloride copolymer, nitrocellulose, maleic acid-modified vinyl chloride/vinyl acetate copolymer and ethylcellulose.

8. A magnetic recording medium according to claim 1, which further comprises a plasticizer or a hardening agent.

9. A magnetic recording medium according to claim 1, wherein the magnetic powder comprises an acicular metal oxide or a metallic iron powder.

10. A magnetic recording medium according to claim 9, wherein the metallic iron powder is surface treated or further mixed with a small amount of nickel, cobalt, titanium, silicon or aluminum in the form of an element, a salt or an oxide.

11. A magnetic recording medium according to claim 1, which comprises an additional lubricant other than said ester lubricant.

12. A magnetic recording medium according to claim 1, wherein the ester lubricant is selected from the group consisting of 2,6-decyltridecyl oleate, 2-octyldodecyl oleate, 2-octyldodecyl erucate, 2-decyltridecyl linoleate, 2-decyltetradecyl oleate, 2-tetradecyloctadecyl oleate, 2-dodecyltetradecyl erucate, 2-decyltetradecyl linoleate, 2-tetradecyloctadecyl undecylenate, 2-decylhexadecyl undecylenate and 2-octyldodecyl nervonate.

* * * * *